(No Model.)
W. KNOWLTON.
Means for Preventing Escape of Sewer Gas from Waste Pipes.
No. 239,512. Patented March 29, 1881.
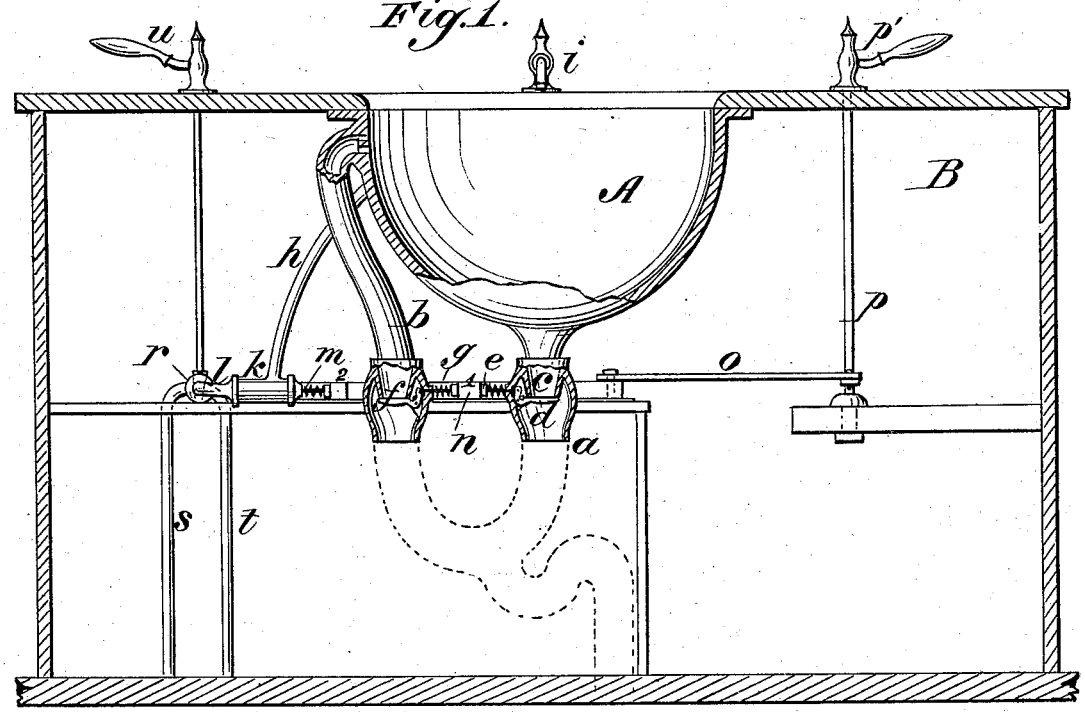
Fig. 1.
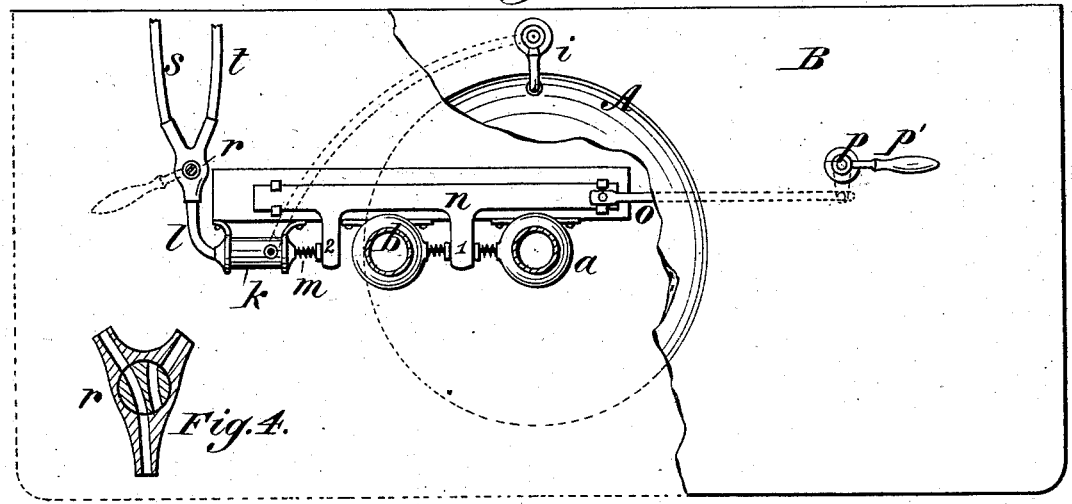
Fig. 2.
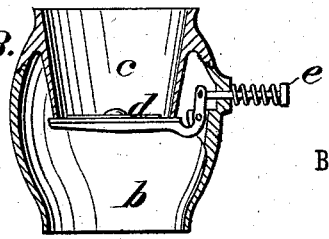
Fig. 3.
Fig. 4.
WITNESSES:
Donn J. Turtchill.
C. Sedgwick
INVENTOR:
W. Knowlton
BY Munn & Co.
ATTORNEYS.
N. PETERS, PHOTO-LITHOGRAPHER, WASHINGTON, D. C.

UNITED STATES PATENT OFFICE.

WILLIS KNOWLTON, OF NEW YORK, N. Y.

MEANS FOR PREVENTING ESCAPE OF SEWER-GAS FROM WASTE-PIPES.

SPECIFICATION forming part of Letters Patent No. 239,512, dated March 29, 1881.

Application filed August 2, 1880. (No model.)

*To all whom it may concern:*

Be it known that I, WILLIS KNOWLTON, of the city, county, and State of New York, have invented a new and useful Improvement in Means for Preventing Escape of Sewer-Gas from Waste-Pipes, of which the following is a specification.

My improvements relate to fittings, for use in connection with wash-basins, for preventing escape of sewer-gas, and for properly operating the cocks or valves.

Heretofore cocks have been applied to waste-pipes for closing such pipes when not in use, but no provision has been made for preventing overflow, or else the arrangements have been complicated and liable to get out of order.

The object of my invention is to provide the waste-pipe with a valve whereby it can be closed, and to combine with such device valves in the water-pipes and means for operating them, whereby the waste-pipe shall be automatically closed, and the overflow-pipe of the basin opened simultaneously with the water-pipe; and to this end my invention consists in the combination of spring flap-valves with the waste and overflow pipes, and a self-closing valve with the water-pipe, fitted for operation by a handle-rod and slide-bar; also, in the combination, with the hot and cold water pipes, of a three-way cock by which either cold or hot water, or both, may be supplied to the basin.

The construction and operation will be more particularly described hereinafter with reference to the accompanying drawings, wherein—

Figure 1 is a sectional elevation of a basin and stand provided with my improvements. Fig. 2 is a sectional plan view of the same; and Fig. 3 is a detail section, in larger size, showing the waste-pipe valve.

Similar letters of reference indicate corresponding parts.

A is the basin, fitted in stand B, and provided with waste-pipe $a$ and overflow-pipe $b$, which are connected to a common waste-pipe and trap. The basin is of usual construction, except that the waste-opening at the bottom is larger than usual, to allow free escape, and the usual plug is dispensed with. The waste-pipe $a$ is enlarged at the upper end, and formed with an annular depending flange $c$. Within this enlargement is a flap-valve, $d$, that is hung on a shoulder at the side of pipe $a$, so that the valve may close upward against flange $c$. In the side of pipe $a$ is fitted a pin, $e$, that is connected to a tail-piece on the valve, and extends outside pipe $a$, where it is provided with a spiral spring, which tends to throw pin $e$ outward and thus close valve $d$. This construction is shown most clearly in Fig. 3. The pin $e$ may be adjoined, to allow change of direction by the swinging movement of the valve. The lower end of overflow-pipe $b$ is fitted with a valve, $f$, in the same manner, which is closed by the spring-pin $g$.

$h$ is the water-pipe from the faucet $i$ of the basin to the valve $k$, that is placed in the water-supply pipe $l$. The valve $k$ is a self-closing valve of usual construction, $m$ being its spring-piston, by which it can be opened by pressure.

Upon a suitable support beneath the basin is fitted a slide-bar, $n$, having side lugs, 1 and 2, and connected by a rod, $o$, with an arm on the vertical rock-shaft $p$, by which the slide is operated. The upper end of rod $p$ extends through the basin-slab, and is provided with a handle, $p'$.

The valves $d$, $f$, and $k$ are placed in line horizontally with the valves $f$ and $k$, fitted to open by movement in one direction, and valve $d$ by movement in the other direction. The slide $n$ is placed so that lug 1 extends between the pistons of valves $df$, and lug 2 in front of piston $m$ of valve $k$. By this construction the normal position is with the water-valve $k$ closed, and pipes $ab$ closed by valves $df$, so that there can be no escape of sewer-gas.

To obtain water the handle $p'$ will be turned in the direction for opening valve $k$ by the lug 2 of slide $n$, and the water will enter the basin. By this movement of slide $n$ its lug 2 will act on pin $e$ of valve $f$ to open that valve, so that the overflow-pipe remains open until the water-valve is closed. As soon as the handle is released both valves close automatically. To discharge the water from the basin the handle is turned in the opposite direction and the valve $d$ thereby opened.

For supplying either hot or cold water to the basin, pipe $l$ is fitted with a three-way cock, $r$, to which the hot-water pipe $s$ and cold-water pipe $t$ connect. The stem of cock $r$ extends upward through the slab, and is fitted with a handle, $u$, for its operation. The valve $r$ is preferably constructed, as shown in the section, Fig. 4, with three branches and a plug having two apertures, so that pipe $l$ may be brought in connection with pipes $s$ and $t$ separately, or in connection with both, for supplying tepid water to the basin.

These arrangements are simple, durable, and convenient. The escape of sewer-gas from the waste-pipe is prevented, while there is no risk of overflowing the basin.

Having thus described my invention, what I claim as new, and desire to secure by Letters Patent, is—

1. The combination of spring flap-valves $d$ $f$, provided with pins $e$ $g$, self-closing valve $k$, having piston $m$, and slide $k$, provided with lugs 1 2, with the basin A, water-pipes $h$ $l$, overflow-pipe $b$, and waste-pipe $a$, substantially as shown and described, for operation as specified.

2. The three-way cock $r$, in combination with water-pipes $s$, $t$, and $l$ and valve $k$, substantially as and for the purposes set forth.

WILLIS KNOWLTON.

Witnesses:
   GEO. D. WALKER,
   C. SEDGWICK.